United States Patent [19]

Gerber et al.

[11] Patent Number: 4,700,253
[45] Date of Patent: Oct. 13, 1987

[54] SLANTED POLE HEAD FOR MAGNETIC RECORDING

[75] Inventors: Joel A. Gerber; Jerry A. Sievers, both of St. Paul, Minn.

[73] Assignee: Minnesota Mining and Manufacturing Company, St. Paul, Minn.

[21] Appl. No.: 554,270

[22] Filed: Nov. 22, 1983

[51] Int. Cl.$^4$ .......................................... G11B 5/187
[52] U.S. Cl. .................................... 360/122; 360/125
[58] Field of Search ............... 360/122, 113, 115, 123, 360/125

[56] References Cited

U.S. PATENT DOCUMENTS

| 2,245,286 | 6/1941 | Marzocchi | 179/100.2 |
| 2,360,625 | 10/1944 | Walker | 179/100.2 |
| 2,501,126 | 3/1950 | Howell | 274/41.4 |
| 2,562,707 | 7/1951 | Faus | 274/38 |
| 3,046,358 | 7/1962 | Comerci | 179/100.2 |
| 3,334,192 | 8/1967 | Camras | 179/100.2 |
| 3,427,409 | 2/1969 | Atsumi | 179/100.2 |
| 4,091,429 | 5/1978 | de Jonge | 360/110 |
| 4,210,946 | 7/1980 | Iwasaki | 360/131 |
| 4,222,084 | 9/1980 | Nakagawa et al. | 360/119 |
| 4,251,842 | 2/1981 | Iwasaki | 360/134 |
| 4,314,298 | 2/1982 | French | 360/121 |

FOREIGN PATENT DOCUMENTS

| 70907 | 9/1983 | European Pat. Off. | |
| 53-9110 | 1/1978 | Japan | |
| 54-41710 | 3/1979 | Japan | |
| 54-74718 | 6/1979 | Japan | |
| 0067932 | 5/1980 | Japan | 360/122 |
| 55-113122 | 9/1980 | Japan | |
| 57-117119 | 7/1982 | Japan | |
| 57-179922 | 11/1982 | Japan | |
| 0208621 | 12/1982 | Japan | 360/113 |
| 58-53013 | 3/1983 | Japan | |
| 58-215713 | 12/1983 | Japan | |
| 1186310 | 4/1970 | United Kingdom | |
| 0581495 | 11/1977 | U.S.S.R. | 360/122 |

OTHER PUBLICATIONS

IBM Technical Disclosure Bulletin, "Edge Effect Magnetic Recording", J. L. Dawson and L. G. Hopkins, vol. 9, No. 7, Dec., 1966.
Kornei, O., "Structure and Performance of Magnetic Transducer Heads", *Journal of the Audio Engineering Society*, Jul., 1953.
Ohtsubo, A. and Satoh, Y., "Thick Non-Parallel Single Pole Head for Perpendicular Recording from One Side," IEEE Trans., Nov., 1982.
Middleton, B. K. and Wright, "Perpendicular Recording", IEEE Proceedings #54, Video and Data Conference, 1982.
Middleton and Wright, "An Analytical Model of the Write Process in Perpendicular Magnetic Recording", *IEEE Transitions Mag.*, May, 1983.

*Primary Examiner*—Stuart N. Hecker
*Assistant Examiner*—David J. Severin
*Attorney, Agent, or Firm*—Donald M. Sell; James A. Smith; Douglas B. Little

[57] ABSTRACT

A magnetic pole head for recording and playback is described. Its features, as illustrated in FIG. 1 are: a high permeability core 1, a magnetic field producing means 3, and an acute angle $\phi$ between the bottom surface and side surface at the trailing portion of the head (i.e. the portion which influences the recording medium 5 last). It has been found that this improved pole head significantly increases the derivative of vertical magnetic field intensity with respect to lateral distance. This increase in the rate at which vertical field intensity changes will allow for higher density perpendicular recording than is feasible with conventional vertical heads.

4 Claims, 10 Drawing Figures

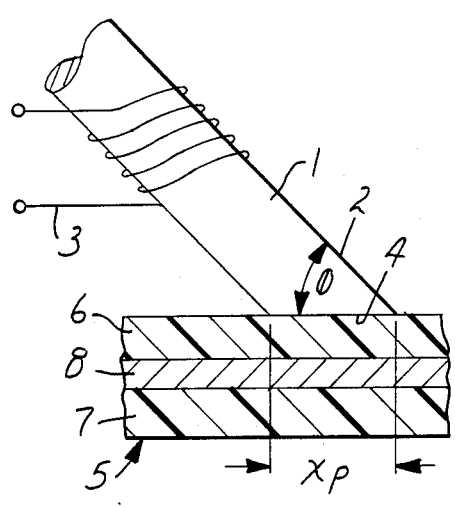
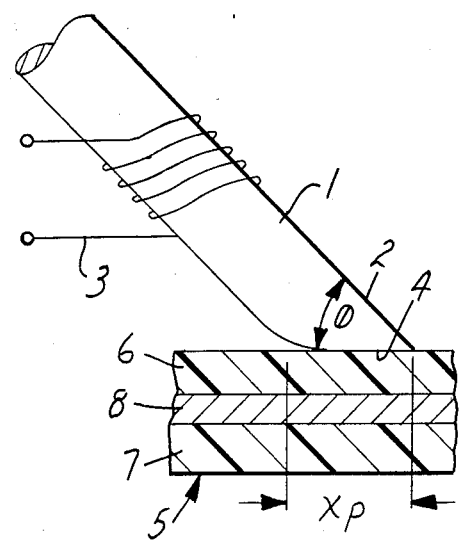
FIG.1  FIG.2
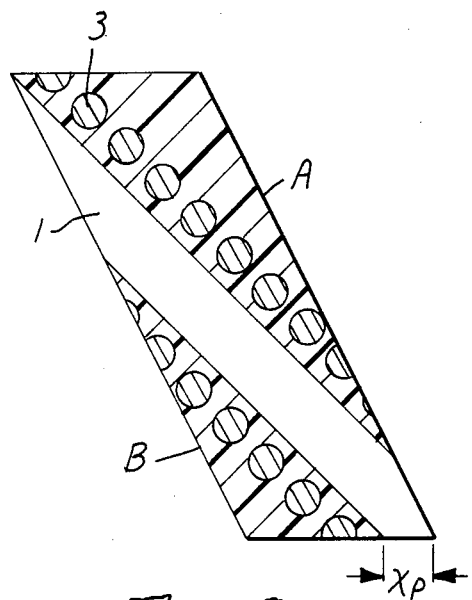
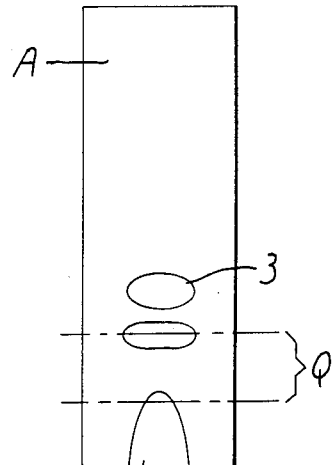
FIG.8  FIG.9

SLANTED POLE HEAD FOR MAGNETIC RECORDING

TECHNICAL FIELD

This invention is in the field of magnetic transducer heads for recording onto and playing back from magnetic media. Specifically, it deals with a new pole head designed for perpendicular recording and playback.

BACKGROUND

In magnetic recording, an electrical current signal is converted to a corresponding induced magnetization in a magnetic medium, e.g., tape or disk. This is done with a transducer, commonly referred to as a head, which transforms the electrical signal into a magnetic field which influences the recording medium as it is transported near the head. A magnetic remanence representative of the field is left in the medium. In the playback, or reproduce mode, the magnetic flux from the medium links through, or modulates, the magnetic circuit of the playback head and induces a voltage change in the head winding. This measured or detected voltage change is subsequently amplified.

Although the thickness of the recording layer on a recording medium is rather small (e.g., 0.1 to 10 micrometers) it is generally only that portion of the layer nearest the head which provides most of the total flux.

Recent advances in the field of magnetic recording have been directed toward high density recording which is especially valuable in the fields of video, instrumentation and data recording. In perpendicular recording, which is felt to be advantageous for high density recording, the easy axis of magnetization of the recording medium is perpendicular to the plane of the medium itself, and the remanence imposed in the medium is a perpendicular remanence.

U.S. Pat. No. 4,210,946 describes a recording medium specifically designed for perpendicular or vertical recording. This medium has a layer of low coercive force material interposed between the magnetic recording layer and the non-magnetic base which supports both the magnetic recording layer and the low coercive force material layer. The advantages of this low coercive force material under-layer are said to be that: (a) it appears to enhance the magnetic field produced by a single-pole magnetic head; and (b) it forms a partially closed magnetic circuit so as to reduce the demagnetization field of the magnetic recording layer.

A pole head differs from the conventional ring head in that it does not have a gap between two poles which gap is used to generate a stray magnetic field. Instead, a pole head comprises a magnetic core and a signal coil usually wrapped around the core. The state of the art in pole head design varies in the placement of auxiliary poles (see U.S. Pat. No. 4,210,946, Column 2 and FIG. 6) and return flux poles, and in the size and placement of the writing pole or core in relation to the auxiliary poles and the current winding. The writing pole is generally oriented normal to the medium. The use of pole heads in vertical recording is discussed in Middleton, B.K. and Wright, C.D., "Perpendicular Recording", presented at the 4th International Conference on Video and Data Recording sponsored by the Institution of Electronic and Radio Engineers, in Great Britain, Apr. 20-23, 1982.

According to present theories, an increase in head field gradient will allow an increase in recorded data density. Therefore, the vertical magnetic field intensity decrease as a function of distance away from the trailing edge (i.e. the last part of the head which influences the magnetic recording medium) should be rapid. Conversely, as referred to herein, the leading edge of a head is the first part of the head which influences the tape or medium by its magnetic field.

DISCLOSURE OF INVENTION

The present invention involves a specially shaped recording head designed for perpendicular recording which produces a greater rate of change in the recording head field than that produced in conventional perpendicular recording heads. The invention is useful for attaining higher recorded data densities than is possible with such conventional heads.

The invention is summarized as a slanted magnetic pole head comprising:
(a) a magnetic field producing means; and
(b) a magnetizable core associated with the magnetic field producing means and defined as a pole having:
(i) a bottom surface intended to face a magnetic recording medium; and
(ii) a side surface which intersects said bottom surface;
(iii) said side surface forming an acute included angle greater than about 15° and less than 90° with said bottom surface.

The magnetizable core or pole piece is made of a soft magnetic material having high permeability and low coercivity. Examples of such materials are: ferrites, amorphous iron-boron, high percentage nickel alloys of iron such as Permalloy and Mumetal, and magnetic alloys such as Sendust magnetic alloy.

Cores are found in a variety of sizes, but it is felt that the widest application for the cores of the inventive pole heads would be for those having a dimension of less than one tenth of a millimeter in the direction parallel to the direction of recording medium travel.

The included angle between the side surface and the bottom surface mentioned above will have an advantageous effect on recorded information density for any angle less than 90°. For practical pole construction, this included angle is greater than 15°. The preferred range of included angles is about 20° to 45°.

For recording in media, the trailing field intensity and rate of change of the perpendicular magnetic field with longitudinal or lateral distance are greater for the slanted pole head of this invention than for conventional pole heads. Improvements on the order of 40 to 80 percent in this rate of change are expected by the use of this invention. These improvements are observed in the part of the recording layer closest to the pole head. Smaller improvements occur at planes deeper in the recording region, but the primary effect of the slanted pole head in sharpening the trailing field distribution is maintained throughout the depth of said recording layer.

The method of recording comprising transporting a magnetic medium close enough to the pole head described above to be influenced by its magnetic field is also considered part of this invention. The use of this invention is not limited to any specific medium and the new pole head may be utilized with thin metal film, pigment type, and other kinds of media designed for perpendicular or horizontal (i.e. in-plane) recording.

BRIEF DESCRIPTION OF THE FIGURES

FIG. 1 is a schematic representation of the slanted pole head of this invention oriented relative to a recording medium.

FIG. 2 is a similar representation to FIG. 1 showing an alternative embodiment of the slanted pole head.

FIG. 8 is a verticle section through an alternative subassembly.

FIG. 9 is a right-side view of the subassembly of FIG. 8.

DETAILED DESCRIPTION OF THE INVENTION

Figure 10:
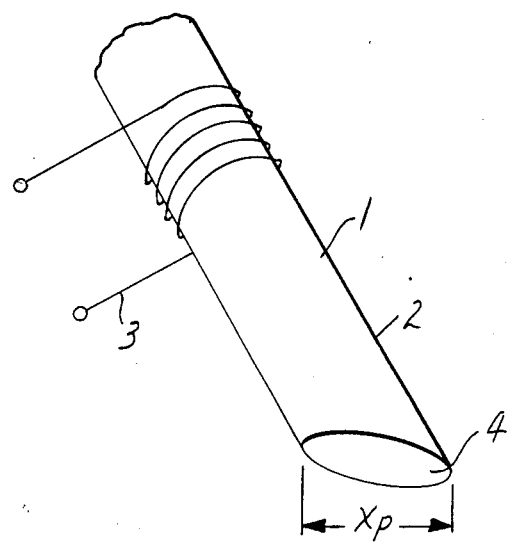
FIG. 10 is a perspective view of the pole head of FIG. 1, showing the eliptically shaped bottom surface.

With reference to FIGS. 1 and 10, item 1 is the magnetic core or pole piece, and item 3 is the magnetic field producing means, in this case a wire coil which induces magnetic flux. Item 5 represents the magnetic recording medium comprising substrate 7 (e.g., polyester), low coercive force (soft) under-layer 8 and high coercive force (hard) magnetic recording layer 6. Angle $\phi$ is the included angle between the side surface 2 and the bottom surface 4 of the pole head, and $X_p$ is the length along the bottom surface of the pole piece facing the recording medium and parallel to its direction of travel. The pole piece could be cylindrical or rectangular in cross-section. In the case of a rectangular cross section, the long dimension would be equivalent to track width.

Figure 5:
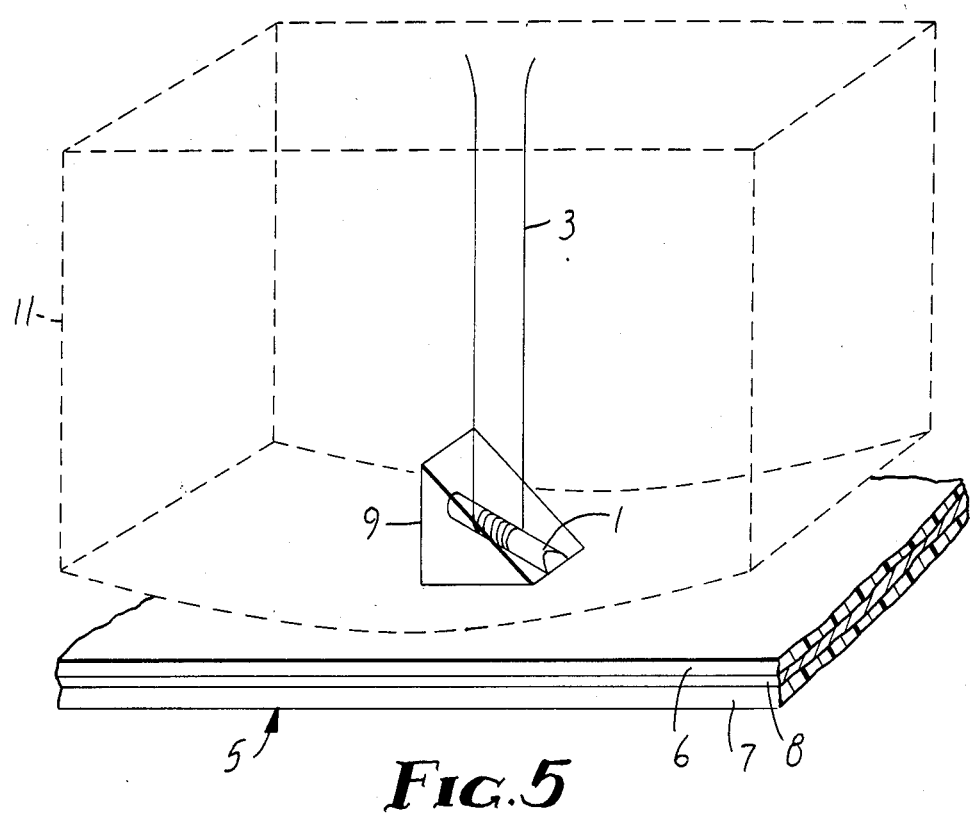
FIG. 5 is a perspective drawing of an assembled recording head containing the pole piece or pole head of this invention.

While FIGS. 1, 2 and 5 illustrate a dual layer recording medium, the improvements of this invention are not limited to any particular perpendicular medium construction. The improvements of this invention will be effective for any perpendicular medium of any composition or construction.

The invention will be further clarified by a consideration of the following example which is intended to be purely exemplary. Field calculations were performed using a finite element analysis for the Maxwell differential equations of magnetic fields, as solved using the POISSON GROUP computer programs obtained from Los Alamos National Laboratory, Los Alamos, N.Mex. Permeabilities, excitation currents and far boundary constraints were the same for both cases solved. The two cases were: (a) a slanted pole head of this invention as shown in FIG. 1 having an included angle $\phi$ of 20°; and (b) a pole head the same as that in (a), except that the angle $\phi$ was 90°, and the pole was oriented normal to the recording medium. For both cases: permeabilities of the under-layer, pole and recording layer were 10,000; 10,000 and 1.0 respectively; excitation was 0.1 ampere turn at 5 to 7 micrometers from the pole tip; recording medium thickness was 1.0 micrometers for the recording layer and 1.0 micrometers for the under layer; and pole thickness was 2.0 micrometers.

Figure 3:
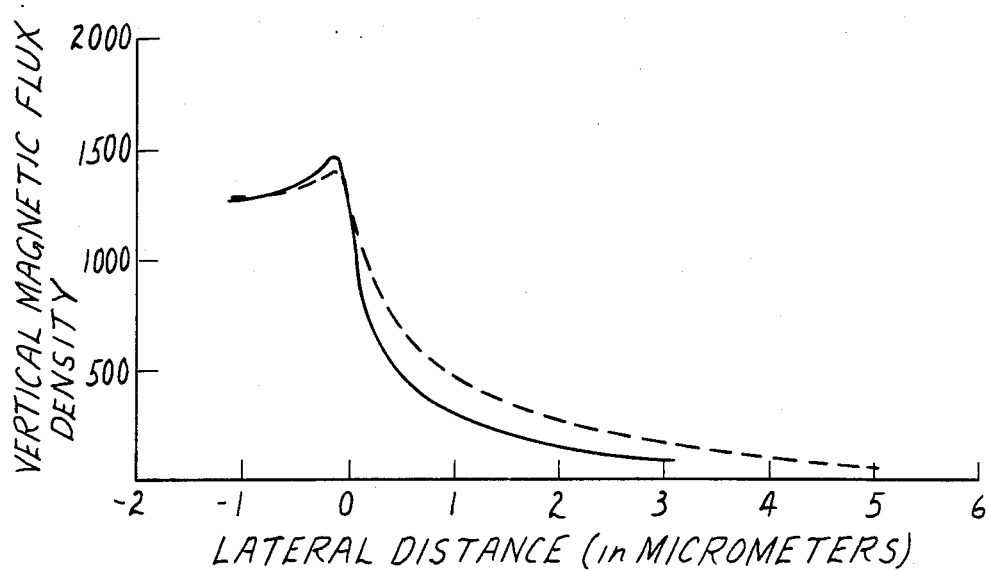
FIG. 3 is a graph of perpendicular magnetic flux density ($B_y$) in Gauss versus lateral distance in micrometers from the trailing edge of a pole head. The solid line is for a head with an included angle of 20° and the dashed line is for a head with an included angle of 90°. Magnetic flux density $B_y$ is plotted for a distance equal to 0.2 micrometers below the pole head surface. In this figure, as in all figures, the direction of magnetic recording medium travel is from left to right.

In FIG. 3, the characteristic perpendicular field intensity of the inventive slanted pole head is plotted with the solid line, while the field intensity of the conventional pole head is plotted with a dotted line. The coordinate system used in FIG. 3 has chosen zero on the abscissa to correspond with the trailing edge of the pole tip. Thus, as one moves along the graph from left to right, one sees the perpendicular field intensity in the recording medium near the upper surface, as it leaves the region of the slanted pole head trailing edge. In the case of the inventive slanted pole head, the maximum derivative of the perpendicular field intensity ($B_y$) with respect to lateral distance, was found to be 2825 Gauss per micrometer. On the other hand, the maximum derivative of perpendicular field intensity with respect to distance for the conventional pole head was found to be 1828 Gauss per micrometer. The maximum perpendicular field gradient or rate at which the intensity of magnetic field component perpendicular to the recording medium changes is significantly greater (55%) in the case of the inventive pole head at its trailing edge than in the case of the conventional ($\phi = 90°$) pole head.

Figure 4:
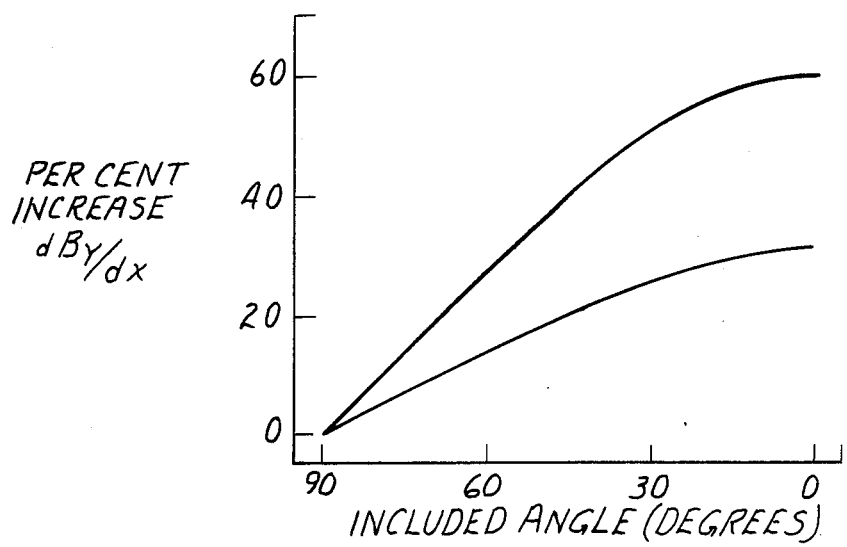
FIG. 4. is a graph of the percent increase of the maximum perpendicular field gradient of the inventive pole heads of FIG. 1 over that of conventional pole heads versus the included angle between the side surface and bottom surface described above. Thus, zero on the ordinate scale represents the maximum field gradient (derivative of perpendicular magnetic flux with respect to lateral distance) for a pole angle of 90°. The upper line of FIG. 4 is the derivative taken in the plane located at a distance into the recording layer of the recording medium equal to two tenths the total thickness of the recording layer. The lower line plotted on FIG. 4 shows the derivative taken in a plane located at a depth of one-half the total thickness of the recording layer.

To further illustrate this point for all the pole angles, FIG. 4 has been plotted to show the maximum derivative of field strength at the various pole angles within the scope of this invention. This graph has been normalized to the maximum derivative found for the conventional ($\phi = 90$) pole head, i.e., 0 on the Y-axis corresponds to the maximum perpendicular field strength derivative for the conventional pole.

Slanted pole heads of this invention can be made using conventional manufacturing techniques modified to obtain the pole tip angle $\phi$ and proper orientation of the head to the medium. The pole piece or core itself can be made of a bulk material, a bar or wire, or may be a deposited thin film. FIG. 5 shows an example of an assembled head made using a bar for the core. The core 1 is wrapped with an induction wire 3 which serves as the magnetic field producing means. The coil wire is normally very fine in order to obtain the required number of turns which may possibly be from about one to 1000. In certain applications, the head can be provided with a hard, wear resistant tip, made of a material such as an iron-aluminum alloy (e.g., Alfesil alloy).

To provide protection against atmospheric influences, the wound pole piece is placed or potted in a non-magnetic substrate or holder 9 which can be made of glass, aluminum, brass, or plastic (e.g. epoxy). The pole piece could be bonded into the holder using epoxy glue or encapsulated in a holder made of plastic or glass.

The article comprising the pole piece encapsulated within the holder is referred to as a subassembly.

Figure 6:
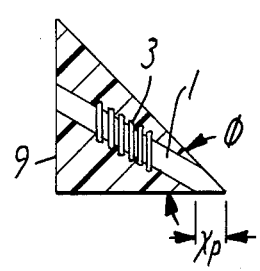
FIG. 6 is a vertical section through a subassembly containing the pole piece, to show how the included angle is obtained.

The correct pole angle $\phi$ and the lateral distance $X_p$ are determined by grinding and lapping the subassembly to obtain the final shape as shown in the sectional view of FIG. 6.

The subassembly may be used as a head itself, by placing it in a suitable bracket, but it may be too small for practical handling and manipulation. Therefore, it may be convenient to place the subassembly within a housing 11 made of a nonmagnetic material such as a ceramic or aluminum. The subassembly would be placed within the housing as shown in FIG. 5 and bonded thereto. The next critical step is the lapping of the housing to obtain the desired contour and proper exposure and orientation of the pole head. The polished pole face is either flush with or protruding from the surrounding housing surface and in contact with the recording medium.

FIG. 5 shows the housing oriented correctly with respect to the medium 5. The medium illustrated comprises a substrate or base layer 7 which is usually a polyester film. On the polyester film are deposited the recording layer 6 and a high-permeability, low coercive force under-layer 8 as described in the Background section.

Figure 7:
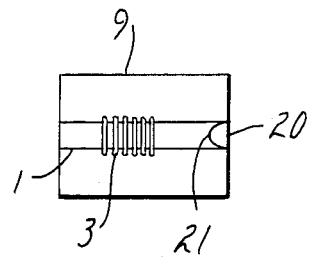
FIG. 7 is a bottom view of the subassembly in FIG. 6.

The bottom view of the subassembly in FIG. 7 illustrates an interesting benefit of this invention. In fabricating the head in the manner described, the intersection of the cylindrical side surface of the wire and the flat bottom surface have been made to form a straight trailing edge 20 and a curved leading edge 21.

This configuration has a benefit in the read process. The edges of the pole head are the parts which read the magnetic flux changes in a medium, and each flux reversal on the medium will cause a pronounced or sharp change in magnetic intensity at edge 20 and a corresponding sharp induced voltage change. On the other hand, flux reversals need more time to traverse the curved edge 21, and the change in magnetic flux and induced voltage is averaged over that time. This aids in playback since for each flux reversal, there is only one coherent, sharp voltage signal to be read at the trailing or sharp gradient edge. The signal averaging or leading edge could be any shape which causes the change in magnetic flux intensity to be averaged over time. For example, it could comprise two straight lines intersecting opposite ends of the trailing edge and joined at a point to give a triangular pole head face.

The bottom view of FIG. 7 and the previous paragraph illustrate that while the scope of this invention relates primarily to the record process, the head may also be used for playback. Another means for achieving effective playback is to round the leading edge of the pole piece as shown in FIG. 2. This has the effect of decreasing the field gradient and thus the playback resolution of the head at its leading edge. It will also be noticed that the obtuse angle between the pole and medium at the leading edge of FIG. 1 has itself the property to reduce the field gradient and thus enhance the playback resolution of the head at its leading edge.

Another means for achieving effective playback is to reduce the distance $X_p$ so that $X_p$ is smaller than the minimum recorded wavelength or distance between flux reversals on the medium. Therefore, for high density recording, $X_p$ is very small, less than 50 micrometers, preferably less than 1 micrometer. Any or all of these means to achieve playback effectiveness may be employed either separately or jointly.

As FIGS. 1 and 2 demonstrate, the bottom surface of the pole tip may be parallel to the recording medium, but it does not have to be.

An alternative subassembly design is shown in FIGS. 8 and 9, in which the pole piece 1 and the coil 3 are potted or embedded in a holder in the shape of a parallelepiped. Faces A and B of the subassembly may be covered with a conductive film (e.g. copper, silver or aluminum) to provide electrical leads to the coil wire. This conductive film may be removed from a band Q to provide electrical isolation of the pole tip. Wires may be bonded to faces A and B to give external electrical connections. This type of subassembly could be mass produced by: embedding a very long core wound with wire in epoxy resin; lapping the sides parallel; dicing the resulting elongate article into individual subassemblies and coating sides A and B with copper.

For an extremely small $x_p$, it is desirable to use thin film techniques in which a film of magnetic material such as an alloy of Nickel, Iron, Molybdenum, Manganese and Silicon obtained as HyMu-80 (trademark of Carpenter Steel Company) or an alloy of cobalt, niobium and zirconium is deposited (e.g. by sputtering) onto a substrate such as a silicon wafer or Fotoceram etchable glass material (from Dow Corning Company). An insulating layer of glass can be deposited over the magnetic material by sputtering, and this can be followed by depositing on the turns or magnetic field producing means (e.g., copper layer).

The actual configuration of the turns and the magnetic pole itself can be determined by photolithography. That is, the pattern or shape is determined by a series of steps after the initial layer is deposited For example, after the copper layer for the turns has been deposited, its pattern might be determined by the following steps: depositing thereon a photosensitive resin or photo resist; exposing the resin to ultraviolet radiation through a mask; removing the mask; etching away the unexposed portions of the resin coating; and dissolving the copper layer no longer protected by the resin coating.

While certain representative embodiments and details have been discussed above for the purpose of illustrating the invention, it will be apparent to those skilled in this art that various changes and modifications may be made in this invention without departing from its true spirit or scope which is indicated by the following claims.

What is claimed is:

1. In a magnetic recording or playback apparatus, the combination of:
    (1) a magnetic recording medium to be transported by the apparatus close to a head; and
    (2) a magnetic pole head comprising:
        a. a magnetic field producing means; and
        b. a magnetizable core associated with the magnetic field producing means and defined as a pole having:
            (i) bottom surface;
            (ii) at least one side surface which intersects said bottom surface;
            (iii) an acute included angle greater than 15° existing between at least one side surface and the bottom surface;
            (iv) a sharp gradient edge at the portion of the intersection of the side and bottom surfaces nearest the location where the smallest included angle is formed; and (v) a signal averaging edge at the portion of the intersection of the side and bottom surfaces opposite the sharp gradient edge; said magnetic pole head being oriented so that the signal averaging edge is the leading edge, and the sharp gradient edge is the trailing edge.

2. The combination of claim 1 in which the trailing edge is a straight line and the leading edge is a curved line intersecting both ends of the trailing edge.

3. In a magnetic recording or playback apparatus, the conbination of:

(A) a magnetic recording medium to be transported by the apparatus close to a head; and (B) a magnetic pole head subassembly comprising:
  (1) a magnetic pole head comprising:
    (a) a magnetic field producing means; and
    (b) a magnetizable core associated with the magnetic field producing means and defined as a pole having:
      (i) a bottom surface;
      (ii) at least one side surface which intersects said bottom surface;
      (iii) an acute included angle greater than 15° between at least one side surface and the bottom surface;
      (iv) a sharp gradient edge at the portion of the intersection of the side and bottom surfaces nearest the location where the smallest included angle in formed; and
      (v) a signal averaging edge at the portion of the intersection of the side and bottom surfaces opposite the sharp gradient edge; and
  (2) a non-magnetic material in which the pole head is encased;

said subassembly being oriented so that the signal averaging edge is the leading edge, and the sharp gradient edge is the trailing edge.

4. The combination recited in claim 3, further comprising a non-magnetic housing into which the magnetic pole head subassembly has been installed, said housing having been given the final desired shape and pole head exposure.

* * * * *

UNITED STATES PATENT AND TRADEMARK OFFICE
CERTIFICATE OF CORRECTION

PATENT NO. : 4,700,253

DATED : October 13, 1987

INVENTOR(S) : Joel A. Gerber and Jerry A. Sievers

It is certified that error appears in the above-identified patent and that said Letters Patent is hereby corrected as shown below:

In the specification:

In Column 4, line 12, "hoth" should be --both--

In Column 5, line 25, "descrihed" should be --described--

In Column 6, line 35, "deposited For" should be --deposited. For--

Signed and Sealed this

Sixteenth Day of August, 1988

Attest:

DONALD J. QUIGG

Attesting Officer     Commissioner of Patents and Trademarks